A. W. CASH.
IMPLEMENT OR DEVICE FOR KILLING OR DISABLING INSECTS, FLIES, AND THE LIKE.
APPLICATION FILED JAN. 3, 1916.
1,179,345.                                          Patented Apr. 11, 1916.
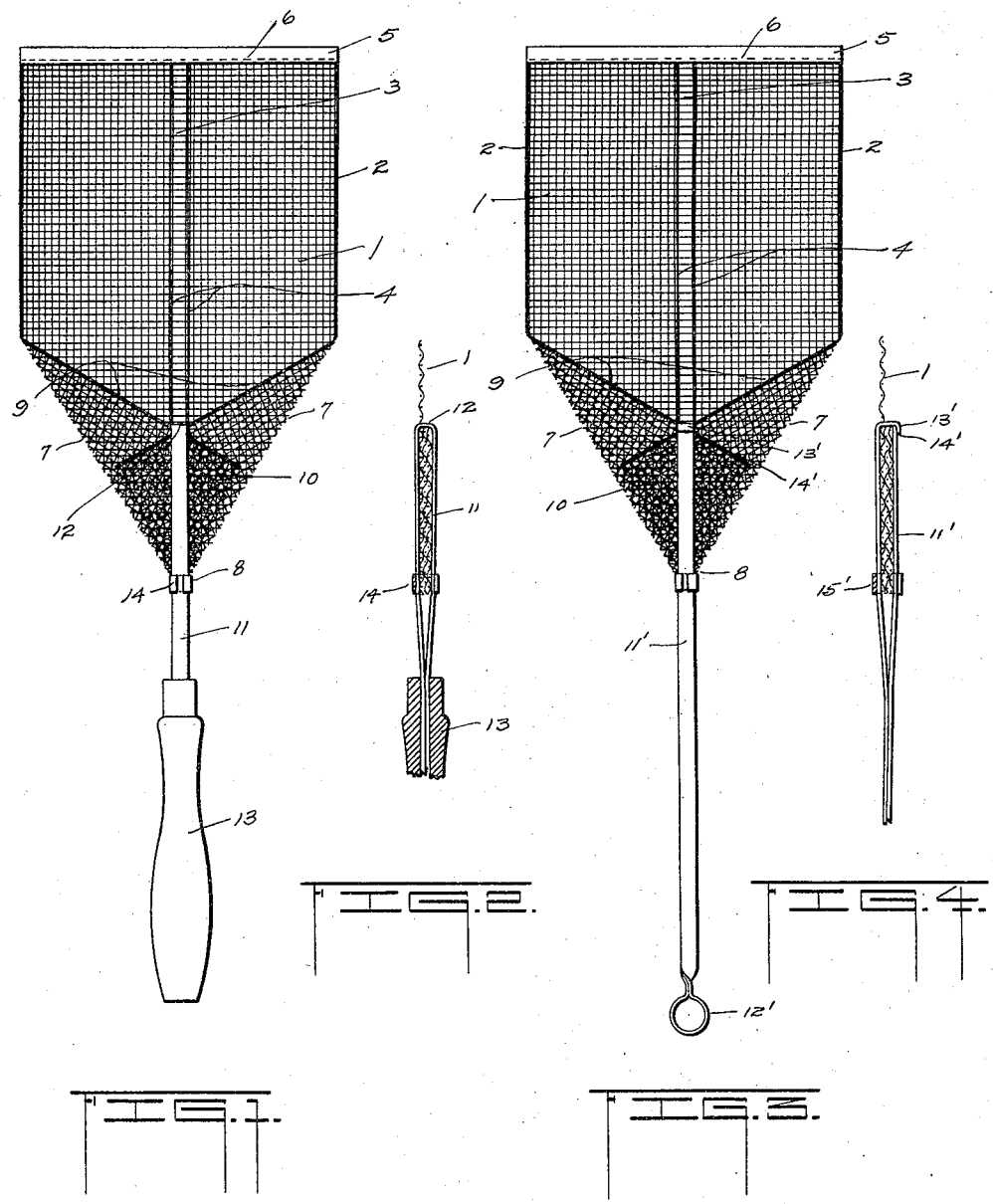

UNITED STATES PATENT OFFICE.

ARTHUR W. CASH, OF DECATUR, ILLINOIS, ASSIGNOR TO UNITED STATES WIRE MAT COMPANY, OF DECATUR, ILLINOIS, A CORPORATION OF ILLINOIS.

IMPLEMENT OR DEVICE FOR KILLING OR DISABLING INSECTS, FLIES, AND THE LIKE.

1,179,345.  Specification of Letters Patent.  Patented Apr. 11, 1916.

Application filed January 3, 1916. Serial No. 69,753.

*To all whom it may concern:*

Be it known that I, ARTHUR W. CASH, a resident of Decatur, county of Macon, and State of Illinois, have invented certain new and useful Improvements in Implements or Devices for Killing or Disabling Insects, Flies, and the like, of which the following is a specification.

My invention relates to improvements in devices for killing and disabling insects and the like, and has particular reference to devices which are commonly called fly killers and fly swatters.

The principal object of this invention is the provision of a handle construction which is simple and effective to provide a secure attachment or anchorage to the body of the killer and bracing the same so as to permit the necessary flexing without injury or damage thereto.

A further object of this invention is the provision in combination with a fly killer body composed of a suitable fabric having its lower corner portions folded over each other and its lower end converging to a point, of a handle member formed in two parts extending on either side of the lower portion of the body and fastened thereto at the lower end thereof by means of a clamping member, said handle member passing through the body portion of the device.

To the accomplishment of the foregoing and such other objects which may hereinafter appear, my invention consists in the combination, construction and arrangement of parts hereinafter described and then sought to be defined in the appended claims, reference being had to the accompanying drawings forming a part hereof and which show merely for the purpose of illustrative disclosure, two embodiments of my invention, it being understood that various other changes may be made in practice within the scope of the claims without digressing from my inventive idea.

In the drawings, Figure 1 represents an elevation of one side of a fly killer constructed according to my invention. Fig. 2 is a vertical section through the upper part of the handle and the lower part of the body portion of the killer shown in Fig. 1; Fig. 3 represents an elevation of one side of a modified form of fly killer constructed according to my invention; Fig. 4 is a vertical section through the upper part of the handle and lower part of the body portion of the killer shown in Fig. 3.

Referring now to the drawings, the numeral 1 designates the body portion of the killer which is shown as being formed preferably of a suitable wire netting or the like and substantially rectangular in shape. This body portion may be formed of netting made in different ways, that shown in the drawing being provided with reinforced selvages 2 and the central spacing 3, having on each side thereof a plurality of wires which are positioned close together to form medial reinforcements 4.

The body of the killer is also provided with the flexible binding 5 on the outer end, which binding is stitched between the meshes removed from the edge, as at 6, so as to prevent the binding from being pulled off or disengaged.

The lower corner portions of the body are folded over upon the body along lines 7 which converge downwardly to the point 8 which forms the lower extremity of said body portion. In thus folding these lower corner portions, the longitudinal reinforcements are extended inwardly and obliquely to form the oblique stays or braces 9, which intersect each other at a point in the medial line extending longitudinally through the body portion of the device. These folded corner portions extend over or overlap each other, as shown at 10.

The handle member is designated generally by the reference character 11 and is formed preferably of cold rolled steel or other suitable material which may be stamped or otherwise operated upon to be shaped as hereinafter described. In the form shown in Fig. 1, this handle member is passed through the body portion of the killer at the intersection of the obliquely extending series of braces and folded upon itself as at 12, the two parts thereof extending downwardly and being secured in the gripping member 13, this being preferably of wood. The two parts of this handle member extend downwardly on opposite sides of the killer body from the point where the handle member is bent to pass through the body and are clamped together and to the lower pointed extremity of the killer body by means of the clamping member 14, this being merely in the form of a clip which passes around the two portions of the handle and is pressed tightly thereagainst, securely clamping the body portion of the killer in place.

In the other form, the handle member 11' is looped at its lower end as at 12' so that it may be hung up when not in use, the two portions of the handle extending upwardly from this loop on opposite sides of the lower portion of the body of the killer. One of these portions of the handle is longer than the other and is passed through the killer body and bent over as at 13', this bent over portion is pressed down upon the end of the other part of the handle as shown at 14'. The upper portions of the handle as in the other form of device, extend on opposite sides of the lower part of the body and are provided with the clamping member 15' which is similar in shape and function to the clamping member 14 previously described.

It is therefore seen that I have provided a construction of killer in which the handle provides parts extending on opposite sides of the lower portion of the body, and which handle member is secured to the body at two points, one being at the intersection of the obliquely extending stays or braces and the other being at the lower extremity of the body portion, due to the use of the clamping member. The two portions of the handle extending on opposite sides of the body between these two points provide a very efficient brace and support for the lower portion of the body of the device without interfering with the desirable flexibility which is so necessary for efficient operation and proper utilization of the device. The handle itself is resilient though to a less degree than the resiliency of the body portion of the killer.

The connection of the handle to the killer body is simple and effective and the device may be made with the fewest possible operations.

The flat metallic handle is advantageous in that the striking surface of the device is not restricted, as the body will lie flat against the surface struck.

It is obvious that I may utilize this handle construction in connection with other forms of killer bodies, the form shown in the drawing is merely for the purpose of illustrative disclosure.

What I claim is:—

1. A device for killing and disabling insects and the like, including in combination, a body member and a handle member, said handle member extending through an intermediate portion of the body member and having parts extending along either side of the lower portion of the body member and beyond the lower extremity thereof and clamping means for securing the lower extremity of the body member between the two portions of the handle member.

2. A device for killing and disabling insects and the like, including in combination, a body member, a flat resilient handle member having a gripping member on its lower portion, said handle member being looped and extending through an intermediate portion of the body member so as to have parts extending along either side of the lower portion of the body member and beyond the lower extremity thereof to said gripping member which is spaced from the body member, and clamping means for securing the lower extremity of the body member between the two parts of the handle member, whereby the body and handle are connected together at two points and the lower portion of the body is braced on both sides thereof.

3. A device for killing and disabling insects and the like including in combination, a body member substantially rectangular in shape but having its lower corner portions folded along lines converging to a point, the upper edges of said folded portions intersecting at a medial point, a handle member extending through the body member at the intersection of the edges of the folded portions and having parts extending down on opposite sides of the lower portion of said body member to brace the same, and a clamping member associated with the handle member and clamping the lower extremity of the body portion between the two parts of the handle member.

ARTHUR W. CASH.

In the presence of—
HAZEL L. BABB,
JOHN L. BENNETT.

Copies of this patent may be obtained for five cents each, by addressing the "Commissioner of Patents, Washington, D. C."